(12) United States Patent
Burstyn et al.

(10) Patent No.: US 6,511,186 B1
(45) Date of Patent: Jan. 28, 2003

(54) FOCUS AND AIM DEVICE AND METHOD FOR IMAGE PROJECTION

(75) Inventors: Herschel Clement Burstyn, Lawrenceville, NJ (US); Michael J. Lurie, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 8 days.

(21) Appl. No.: 09/611,708

(22) Filed: Jul. 7, 2000

Related U.S. Application Data

(60) Provisional application No. 60/143,058, filed on Jul. 9, 1999.

(51) Int. Cl.[7] .................. G03B 21/00; G03B 21/26; G03B 21/22; G03B 21/28; G02B 26/08
(52) U.S. Cl. ............... 353/76; 353/33; 353/34; 353/37; 353/78; 353/94; 353/101; 359/196; 359/200; 359/202; 359/205; 359/210; 359/211; 359/218; 359/221; 359/226; 359/256; 359/259; 359/460
(58) Field of Search ............... 353/30, 31, 33, 353/34, 37, 76, 77, 78, 94, 101; 359/196, 200, 201, 202, 205, 210, 211, 216, 218, 221, 226, 456, 459, 460

(56) References Cited

U.S. PATENT DOCUMENTS

| | | | |
|---|---|---|---|
| 3,507,984 A | * 4/1970 | Stavis | 348/757 |
| 3,736,411 A | * 5/1973 | Berndt | 345/440 |
| 4,944,656 A | 7/1990 | Feng et al. | 116/173 |
| 4,969,732 A | 11/1990 | Wright et al. | 353/77 |
| 5,019,807 A | 5/1991 | Stapleton et al. | 345/206 |
| 5,179,440 A | 1/1993 | Loban et al. | 348/383 |
| 5,333,072 A | 7/1994 | Willet | 349/6 |
| 5,467,154 A | * 11/1995 | Gale et al. | 353/119 |
| 5,573,324 A | 11/1996 | De Vaan | 353/77 |
| 5,613,748 A | 3/1997 | Yoshida et al. | 353/74 |
| 5,639,151 A | 6/1997 | McNelley et al. | 353/98 |
| 5,741,057 A | 4/1998 | Goldberg et al. | 353/74 |
| 5,975,703 A | 11/1999 | Holman et al. | 353/20 |
| 5,995,268 A | * 11/1999 | Shiraishi et al. | 359/204 |
| 6,012,816 A | 1/2000 | Beiser | 353/122 |
| 6,023,369 A | 2/2000 | Goto | 359/443 |
| 6,046,847 A | 4/2000 | Takahashi | 359/457 |
| 6,052,226 A | 4/2000 | Takahashi | 359/457 |
| 6,061,178 A | 5/2000 | Park | 359/457 |
| 6,185,038 B1 | * 2/2001 | Yamaguchi et al. | 359/457 |
| 6,211,932 B1 | * 4/2001 | Iigahama et al. | 349/95 |
| 6,351,324 B1 | * 2/2002 | Flint | 359/202 |

* cited by examiner

*Primary Examiner*—Russell Adams
*Assistant Examiner*—Magda Cruz
(74) *Attorney, Agent, or Firm*—W. J. Burke

(57) ABSTRACT

An image projection system includes an image generator, a screen and a focus and aim component. The focus and aim component receives modulated light from the image generator and focuses and deflects the light as a function of a position on the screen. The component consists of an array of lenslets with wedge. The wedge or prism refracts the light and the lens focuses the light. As a result, the optics are selectively tailored to provide a clear image over the entire field of view, even in systems compact in depth that would otherwise rely on a short focal length lens. Acute incidence angles at the periphery of the screen are handled by TIR Fresnel lens elements or by diffractive elements. The focus and aim capability is alternatively provided by holographic elements in a holographic array.

14 Claims, 5 Drawing Sheets

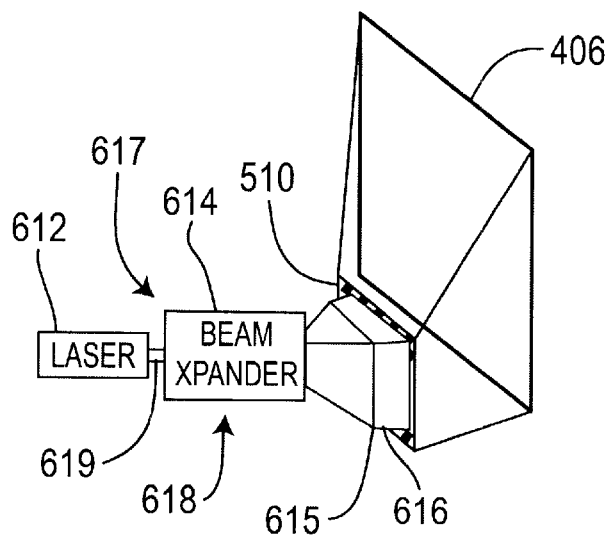
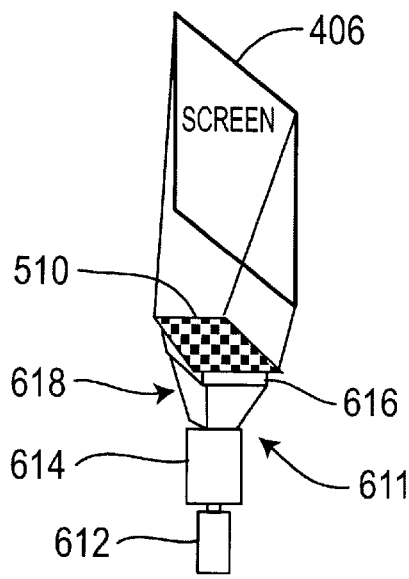
FIG. 4a  FIG. 4b
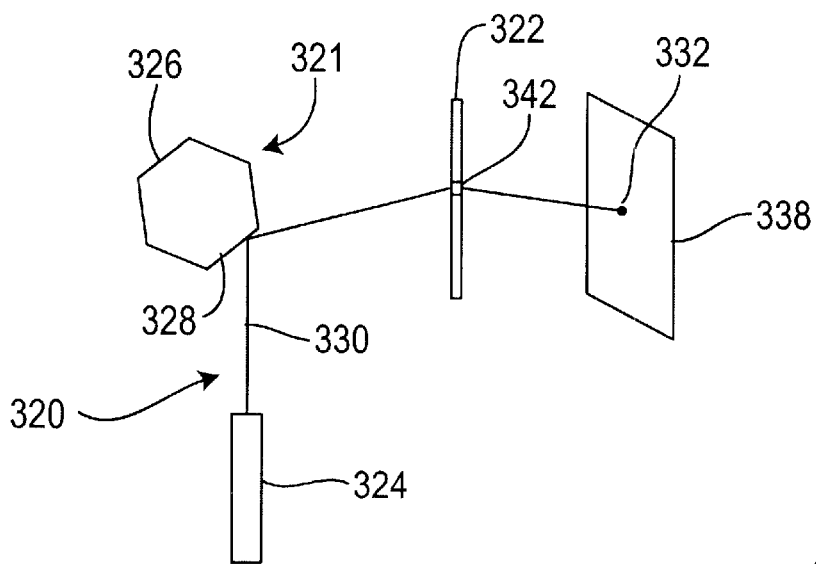
FIG. 5a
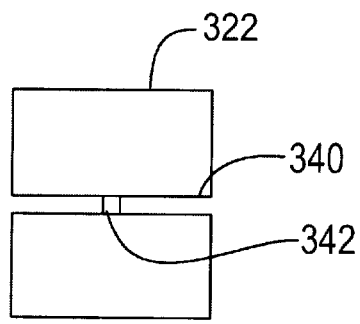
FIG. 5b

FOCUS AND AIM DEVICE AND METHOD FOR IMAGE PROJECTION

RELATED APPLICATION

This application claims priority from U.S. Provisional Patent Application No. 60/143,058, entitled "Compact Rear Projection System Based upon a Curved Turning Mirror and Anamorphic Projection" filed Jul. 9, 1999, which is incorporated herein by reference.

FIELD OF THE INVENTION

This invention relates to rear projection systems, and more particularly to compact rear projection systems that use separate optics for various areas of a viewing screen.

BACKGROUND OF THE INVENTION

Rear projection imaging systems typically include an image generation source, optics to enlarge and direct the image and a transmission screen for displaying the enlarged image. The image source can be of many different types, including cathode-ray tubes and liquid crystal displays (LCDs). In simple systems, the optics generally include a lens, such as a combined convex glass lens element and a methacrylic resin lens element, and a turning mirror for directing the image toward the screen. The transmission screens of typical systems generally include diffusing material, lenticular lens sheets and Fresnel lens sheets, which are intended to project a wide image with uniform brightness.

In operation, the image source is positioned behind the transmission screen and provides a small, bright image to the projecting lens. The projecting lens enlarges the image and directs it to the reflective surface of the turning mirror. The turning mirror reflects the image to the transmission screen. The lens sheets in the transmission screen further enlarge the image and collimate the projected light. The audience views the projected image from the transmission screen.

The depth dimension of known rear projection systems is constrained by the angle of incidence on and within the transmission screen's Fresnel lens. To make a compact rear projection package, a short focal length lens is required. A decreasing focal length increases the field of view as measured at the screen. As the field of view increases, the angles of incidence in air and within the Fresnel lens eventually approach the critical angle, causing transmission to drop to zero. Even before the angle of incidence reaches the critical angle, the angle of incidence will exceed the Brewster angle. Exceeding the Brewster angle can cause the S (perpendicular) and P (parallel) polarization transmission coefficients to diverge, resulting in image distortions, such as non-uniformity in brightness across the screen.

SUMMARY OF THE INVENTION

A projection system according to the principles of the invention tailors optics to various regions of a viewing screen. In one aspect of the invention, an image projection system includes an image generator, a viewing screen and a focus and aim component (FAC). The FAC is disposed to receive light corresponding to portions of the image from the image generator. The FAC deflects and focuses the light as a function of a position on the screen. An exemplary FAC includes a light-focusing device, such as a lens, and a light-deflecting device, such as a prism. The devices are disposed to receive a light beam in tandem representative of an image portion, such as a pixel. The light-deflecting device aims, and the light-focusing device focuses, the beam as a function of spot position on a screen. Another example of a light valve is a digital micro mirror device (DMD) or a digital light processor (DLP).

BRIEF DESCRIPTION OF THE DRAWINGS

The teachings of the present invention can be readily understood by considering the following detailed description in conjunction with the accompanying drawings, in which:

FIGS. 4 (a)–(b) each illustrate respective embodiments of the invention.

FIGS. 5 (a)–(b) show a first scanning embodiment of the invention.

DETAILED DESCRIPTION

Figure 3A:
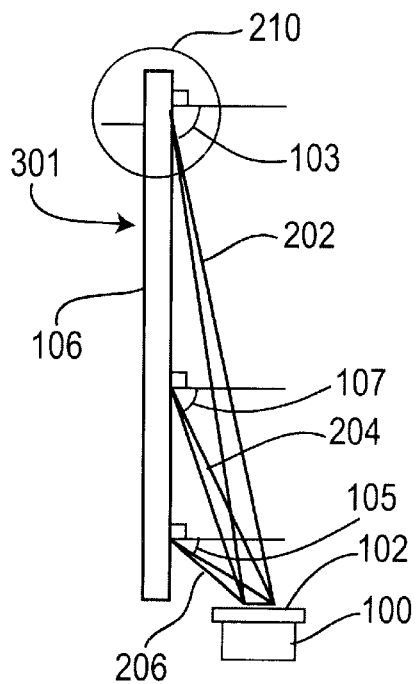
FIGS. 3 (a)–(b) show, respectively, a side view of a projection system and a magnified screen detail.

A projection system according to the principles of the invention provides for decreased cabinet depth without sacrificing image quality due to variable focal lengths over the viewing screen. An exemplary image projection system 301 is shown in FIG. 3(a). In this system 301, a two-dimensional image generator 100 generates an image for viewing on a viewing screen 106. The two-dimensional image generator 100 can be, for example, a scanner, a light valve, or some other image projection device. A light valve is an optical switch, such a liquid crystal display (LCD), which switches optical signals to corresponding pixels on a display screen. Another example of a light valve is a digital light modulator (DMD).

An optical component, hereafter referred to as a focus and aim component 102 (FAC), receives light from the image generator and focuses it on the screen. As will be explained more fully, the FAC can include multiple tandems of light focusing and light aiming devices. These tandem devices are optically responsive to selected portions of the image generated by the image generator 100, and focus the portions on corresponding spot locations on the screen 106.

In FIG. 3(a), three exemplary beams 202, 204 and 206 output from the FAC 102 are shown. These beams strike the screen 106 at three different locations. A first beam 202 strikes the viewing screen 106 at an upper portion and at a relatively acute incident angle 103. A second beam 206 strikes the screen 106 in a lower portion and at a less acute incident angle 105. The third illustrated beam 204 strikes the screen 106 in a middle portion and at an intermediate incident angle 107. The optical path lengths for these beams 202, 204 and 206 from the FAC 102 to the screen 106 differ.

The FAC 102 includes focusing devices, such as lenses, to accommodate the differing optical path lengths and resulting different focal lengths.

The screen 106 in this system 301 includes a total-internal-reflection (TIR) Fresnel lens.

Figure 3B:
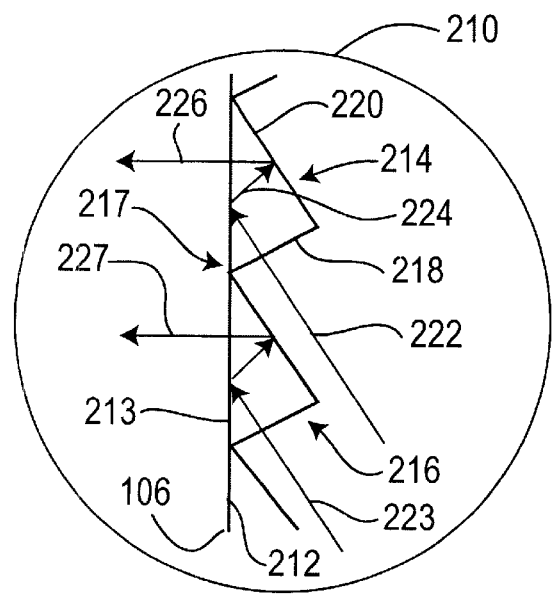

A screen detail 210 shown in FIG. 3(*b*) shows a ray trace for one beam 202 as incident to the screen 106. The screen 106 has an incident surface 212. Fixed to the surface 212 are the TIR Fresnel lens elements 214 and 216. The Fresnel lens elements receive from the FAC 102 projected light as illustrated by the incident rays 222 and 223, respectively. One ray 222 is incident at the surface 212 at an angle that exceeds the critical angle, causing the ray 222 to reflect totally from the surface 212, as shown by the reflected ray 224. The reflected ray 224 then reflects off a reflective facet 220, which collimates the light 226 and directs the light to the screen 106. The collimated ray 226 is incident at the surface 212 at an angle less than the critical angle, and thus passes through the screen 106.

Similarly, the other illustrative TIR Fresnel lens element 216 receives light from the FAC, as shown by a second ray 223, and outputs a collimated ray 227 that is parallel to the collimated ray 226 output by the other TIR element 218 in the detail 210. A plurality of collimated rays corresponding to the beam 202 form a portion of an image, or a "spot," on the screen 106 at a spot position 213. The spot at the spot position 213 can be a portion of an image that corresponds to a pixel. The image generator 100 modulates the plurality of light rays corresponding to the pixel by an image value that is characteristic of that portion. The image value may describe, for example, light intensity or color.

Figure 1A:
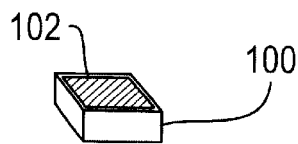
FIG. 1 provides perspective views of a focus and aim component.
Figure 1B:
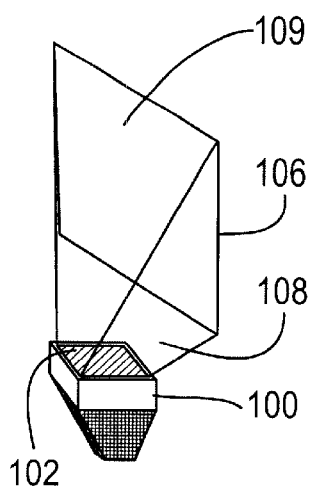

A perspective view of the image generator 100, FAC 102 and screen 106 is shown in FIG. 1. The screen 106 has multiple spot positions for multiple incoming beams 108. The multiple incoming beams 108 striking their corresponding spots form a composite image 109 on the screen 106. Each of the multiple incoming beams 108 is aimed and focused by the FAC 102 to a corresponding spot on the screen 106. In this manner, the image maintains uniform focus across the screen 106. As in the system of FIG. 3(*a*), a TIR Fresnel lens (not shown) accommodates incident angle exceeding the critical angle.

Figure 2:
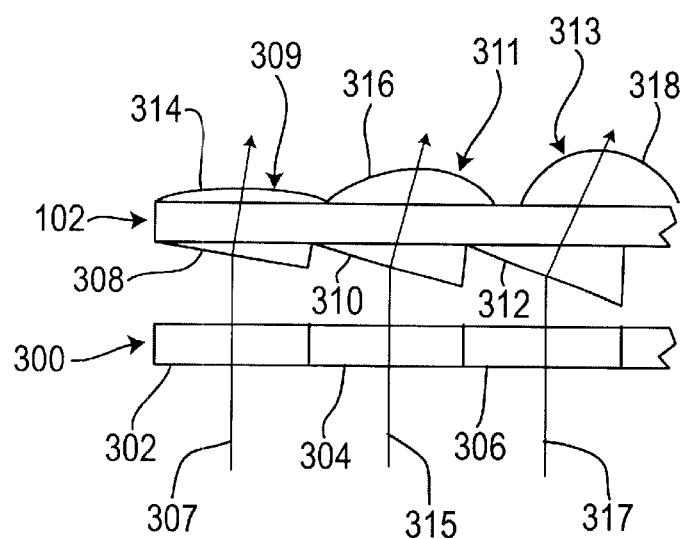
FIG. 2 shows a side view of a focus and aim component.

FIG. 2 shows a side view of an FAC 102 according to the principles of the invention, such as the FAC 102 shown in FIGS. 1 and 3(*a*). The FAC 102 is responsive to light from a group of pixels 300. Light represented by rays 307, 315 and 317 corresponding to respective pixels 302, 304 and 306 passes to prisms 308, 310 and 312 on the FAC 102. The prisms are light-deflecting devices that direct or aim the beams 307, 315 and 317 to corresponding spot locations on a screen (not shown). The beams pass respectively through lenses 314, 316 and 318, which are light-focusing devices. The lenses 309, 311 and 313 have focal lengths tailored to the particular location on the screen (not shown). The FAC 102 has a plurality of FAC elements that form an array. The array elements each correspond both to a pixel of an image generator and to a screen location.

In one implementation of an image projection system, the image generator includes an LCD. The display screen of the LCD is placed in close proximity to the FAC so that each pixel in the display screen sends light to a corresponding FAC element, which aims and focuses the light to form a corresponding spot on a viewing screen. FIG. 4(*a*) illustrates an image projection system 617 having an image generator 618 that consists of a laser 612, a beam expander 614 and a light valve 616. This embodiment uses a laser, but can also implemented instead with another light source, such as a metal halide lamp. The laser 612 emits a beam 619, which the laser has modulated so that the beam 619 carries image information. The beam expander 614 expands the laser beam 619 and forwards it to the light valve 616. The light valve 616 has a light valve pixel array 615, which the light valve 616 operates based upon the received expanded beam 619. Each pixel in the light valve pixel array 615 sends light to a corresponding FAC element of an FAC 510. The FAC elements each focus and aim the received light onto a viewing screen 406.

In FIG. 4(*b*), an image projection system 618 operates according to the same principles as the embodiment in FIG. 4(*a*), except that here the image generator and FAC are rotated by 90 degrees. An image generator 611 includes a laser 612, a beam expander 614 and a light valve 616. As in the previous embodiment, the light valve 616 illuminates an FAC 510, which in turn illuminates a viewing screen 406. The FIG. 4(*b*) embodiment affords a cabinet design of slimmer depth than does the embodiment in FIG. 4(*a*).

A scanning projection system 320 according to the principles of the invention is shown in FIG. 5(*a*). This scanning projection system 320 is another implementation of the image projection system 301 discussed above. In this implementation, the image generator 321 is a scanner that consists of a laser 324 and a rotating prism 326. The laser 324 modulates and projects a laser beam 330 that reflects off a facet 328 of the rotating prism 326 and arrives at the FAC 322. A focus and aim device 342 on the FAC 322 focuses and deflects the beam 330 to a spot 332 on the viewing screen 338. The laser 324 translates normal to the page in FIG. 5(*a*), or, alternatively, rotates in a direction normal to the page. This scans the beam 330 across a row 340 of FAC elements, as shown in FIG. 5(*b*). A corresponding row of spots (not shown) is traversed on the screen 338 during this scan. A next row of FAC elements is similarly scanned as the rotating prism rotates so that the beam 330 is directed to that next row. In this way, the entire FAC 322 is traversed during scanning, delivering an entire corresponding array of spots to the screen 338. The laser 324 pulses the beam 330 in correspondence with the discrete locations of FAC elements in the FAC 322. Each pulse corresponds to a direction at which the beam 330 leaves the laser 324. Those directions are known here as addressable light directions of the scanner 321. The addressable light directions in this embodiment serve the same purpose as do the LCD pixels of the previous embodiment. There, each pixel corresponds with an FAC element. Here, each addressable light direction corresponds with an FAC element.

Figure 6A:
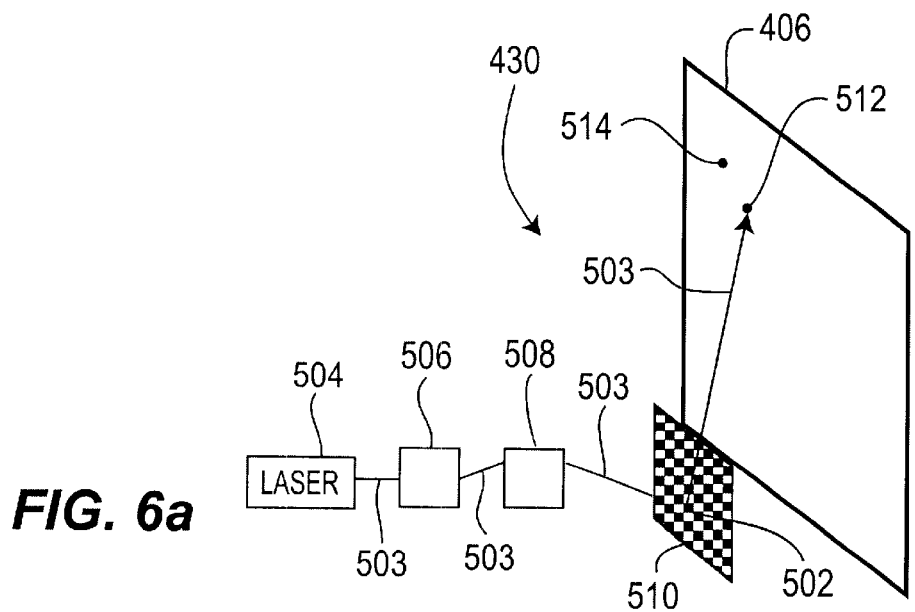
FIGS. 6 (a)–(b) show a holographic embodiment of the invention.
Figure 6B:
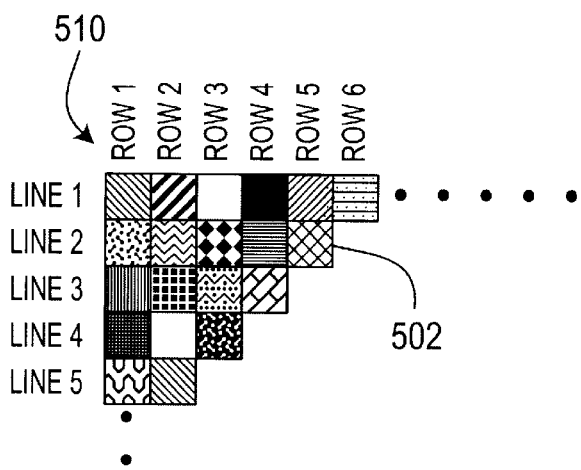

A projection system 430 according to the principles of the invention can also be implemented with a holographic element array (HEA) operating as a FAC. In FIG. 6(*a*), a scanning projection system 430 using a HEA 510 as the FAC is shown. The system 430 includes a laser 504, a vertical scanner 506, a horizontal scanner 508, and the HEA or holographic "memory" 510. The array 510 is arranged in a holographic array configuration 510 composed of holographic array elements 502, as shown in FIG. 6(*b*). The elements 502 are arranged in locations corresponding to horizontal lines and vertical rows. The elements 502 have a diffractive holographic grating with light-focusing means and light-deflecting means to focus an incoming beam on a corresponding spot location of a viewing screen.

The laser 504 modulates and outputs a light beam 503 to the vertical scanner 506. The vertical scanner 506 directs the beam 503 in accordance with a desired vertical location on the HEA 510. The horizontal scanner 508 also acts on the beam 503 to direct it to a desired horizontal location on the array 510. The beam is then directed to the corresponding holographic element 502 which focuses the beam 503 to a spot 512 on the viewing screen 406. The viewing screen 406 has a plurality of spot locations 514, each corresponding to an element 502 that acts to form the image spot 512 on the screen 406. As the system 430 scans the HEA, an image is projected to the screen 406.

Figure 7:
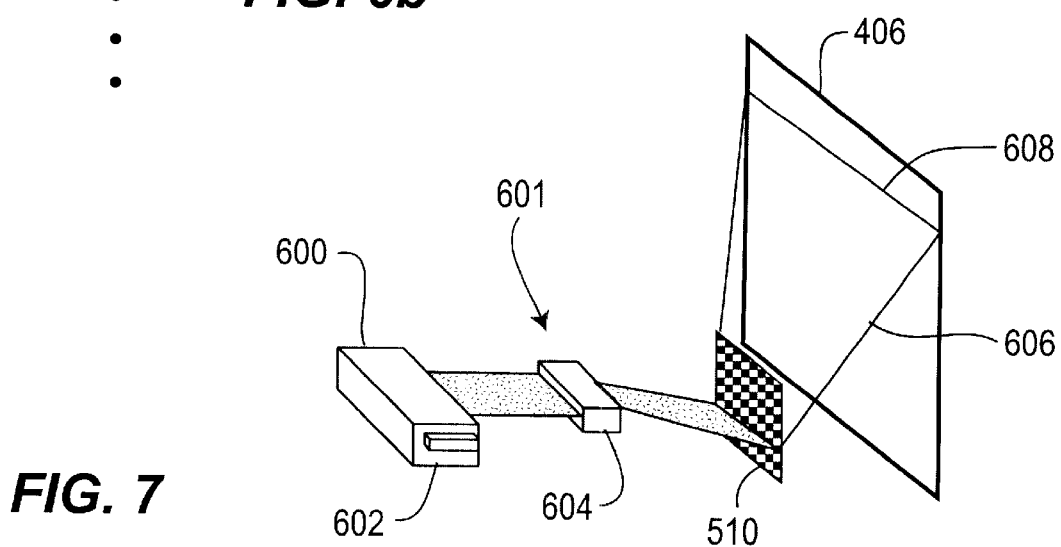
FIG. 7 shows a second scanning embodiment of the invention.

FIG. 7 shows another scanning projection system 601 including a laser line array 600, a vertical scanner 604 and a HEA 510. The laser line array 600 further includes a line of lasers 602, each laser of the line 602 corresponding to a pixel of information. The lasers 602 modulate and project laser light to the vertical scanner 604, which vertically deflects the light to a line of holographic elements of the holographic array element 510. The line of holographic elements projects a beam line array 606 to form a spot line array 608 on the viewing screen 406.

An HEA may be used to implement an FAC in the scanning projection system 320, shown in FIG. 5. Moreover, an HEA can also replace an FAC in the non-scanning image projection systems 617 and 618 in FIGS. 4(*a*)–(*b*). In that case, the FIG. 4(*b*) configuration can offer an additional advantage, beyond slimming cabinet depth. As the viewing screen 406 is brought closer to the FAC 510 in FIG. 4(*a*), the angle at which light leaves the top of the HEA (since the FAC is implemented as an HEA) becomes more acute. The angle may become acute enough to interfere with diffraction from HEA elements at the top of the HEA. Rotating the configuration, as in FIG. 4(*b*) lessens the acuteness of the angle, so that diffraction operates correctly even with slim cabinet depth. As an alternative, rotation of an image generator may be lessened or eliminated by interposing a folding mirror between the generator and the HEA. The folding mirror deflects light from the generator to the HEA, in lieu of rotating the generator. As a further alternative, if the pixel size of a light valve is too small, a projection lens can be interposed between the light valve and the HEA. The beam 1044 arrives at a holographic array 1042 and continues on to a viewing screen (not shown).

Figure 8A:
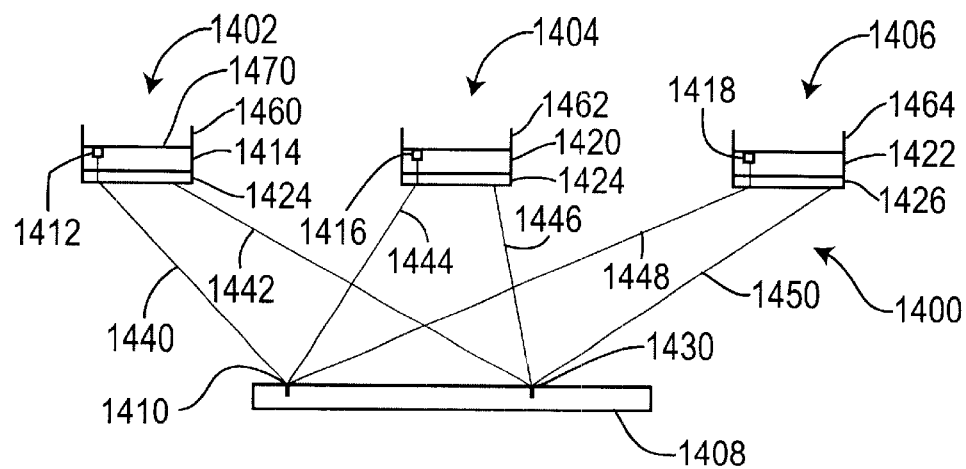
FIGS. 8 (a)–(b): show an embodiment of the invention using a color screen.
Figure 8B:
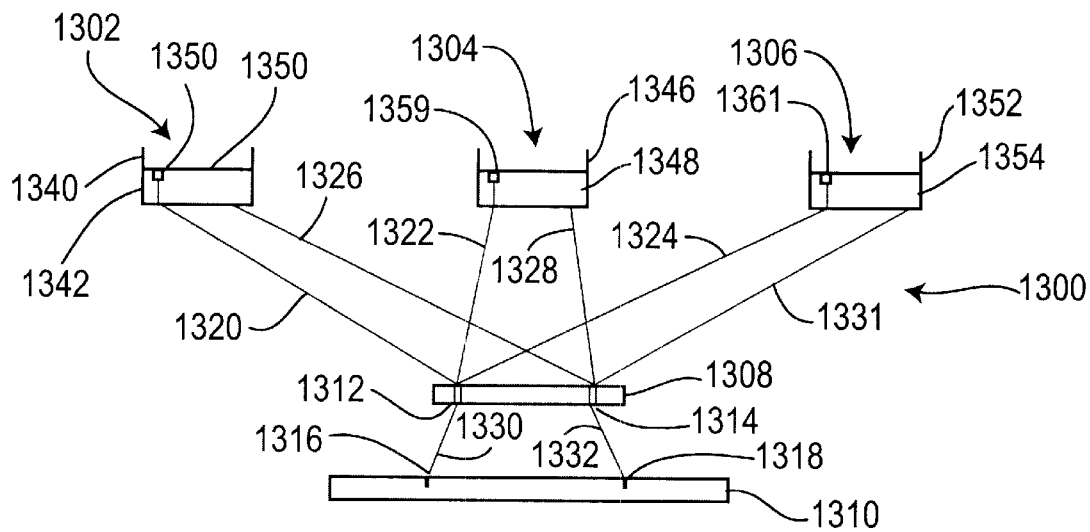

An first embodiment of the invention using a color screen is shown in FIG. 8(*a*). A color projection system 1400 includes a red light valve 1402, a green light valve 1404, a blue light valve 1404 and a viewing screen 1408. The red light valve 1402 consists of an LCD 1460, a phase screen 1414 and an HEA 1424. A phase screen is a screen having areas of variable thickness so that the index of refraction is a function of position. Here, three phase screens are used to converge correspondingly differently colored light projected for a single pixel. The phase screen 1414 serves as a screen for the LCD 1460. The phase screen 1414 has a LCD array 1470 that defines each pixel 1412 of the LCD 1460. The HEA 1424 is "printed" on the phase screen 1414, as by lamination or by other techniques. As a result, each holographic element of the HEA 1424 is incorporated in a corresponding pixel 1412 of the LCD 1460. Similarly, for the green light valve 1404, an HEA 1424 is combined with a phase screen 1420 on an LCD 1462. Also, for the blue light valve 1406, an HEA 1426 is combined with a phase screen 1422 on an LCD 1464.

Operationally, for the red light valve 1402, the phase screen 1414 acts in tandem with the HEA 1424 to direct the light beam 1440 from the pixel 1412 to a spot location 1410 on the viewing screen 1408. Similarly, for the green light valve 1404, the phase screen 1420 acts in tandem with the HEA 1424 to direct the light beam 1444 from the pixel 1416 to the same spot location 1410 on the viewing screen 1408. Also, for the blue light valve 1406, the phase screen 1422 acts in tandem with the HEA 1426 to direct the light beam 1448 from the pixel 1418 to the same spot location 1410 on the viewing screen 1408. Accordingly, each of the phase screens acts in tandem with its corresponding HEA to converge the light beam for a given pixel. An analogous architecture holds for the spot location 1430 on the viewing screen 1408. The red light valve 1402 projects a light beam 1442 to the spot location 1430, the green light valve projects the light beam 1446 to the same spot location 1430 and the blue light valve projects the light beam 1450 to the same spot location 1430. In similar fashion, for a plurality of other screen locations, light from corresponding pixels 1412, 1416 and 1418 converge to a corresponding spot location of the viewing screen 1408.

FIG. 8(*b*) illustrates a second embodiment of the invention using a color screen. A color projection system 1300 includes a red light valve 1302, green light valve 1304 and blue light valve 1306, a volume hologram or volume HEA 1308, and a viewing screen 1310. The red light valve 1302 consists of an LCD 1340 and a phase screen 1342. Each element of the volume HEA has a volumetric grating that superposes incident light beams of different colors to focus and aim the superposed beam to a desired screen location. As in the previous embodiment, the phase screen 1342 serves as a screen for the LCD 1340. The phase screen 1342 has an LCD array 1350 that defines each pixel 1350 of the LCD 1340. Similarly, the green light valve 1304 consists of an LCD 1346 and a phase screen 1348, which serves as screen for the LCD 1346. Also, the blue light valve 1306 consists of an LCD 1352 and a phase screen 1354, which serves as a screen for the LCD 1352. As with the red light valve 1302, both the green light valve 1304 and the blue light valve 1306 have their respective LCD arrays that define corresponding pixels 1359 and 1361.

Operationally, for the red light valve 1302, a light beam 1320 from a pixel 1350 is projected from the phase screen 1342. The light beam 1320 arrives at a volume HEA 1312 of the volume hologram 1308. The green light valve 1304 and blue light valve 1306 similarly project their corresponding light beams 1322 and 1324 from corresponding pixels 1359 and 1361 to the volume HEA 1312. Element 1312 superposes the three differently colored light beams 1320, 1322 and 1324 to form a light beam 1330 that arrives at the viewing screen 1310 at a spot location 1316. The phase screens 1342 1348 and 1354 are each configured differently to converge the three beam 1320, 1322 and 1324 to a common volume HEA 1312. In an analogous way, light beams 1326, 1328 and 1331 are received from light valves 1302, 1304 and 1306 by a volume HEA 1314 of the volume hologram 1308. The three light beams 1326, 1328 and 1331 are superposed to form a light beam 1332 that arrives at a spot location 1318 of the viewing screen 1310. A plurality of other red, green and blue light beams, in similar fashion, are superposed by the volume hologram 1308 and directed to the viewing screen 1310.

Figure 9A:
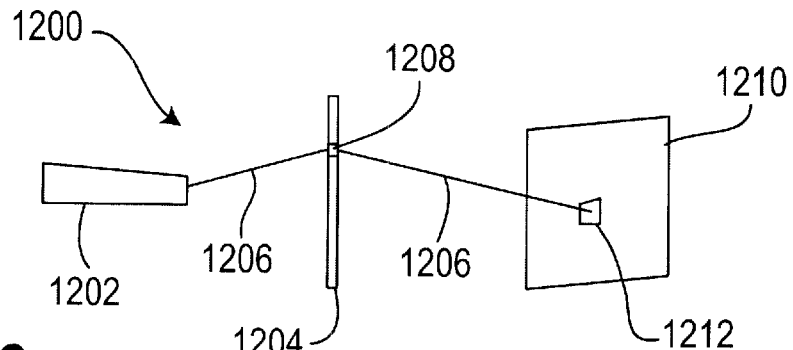
FIGS. 9(a)–(b) show a second embodiment of the invention using a color screen.
Figure 9B:
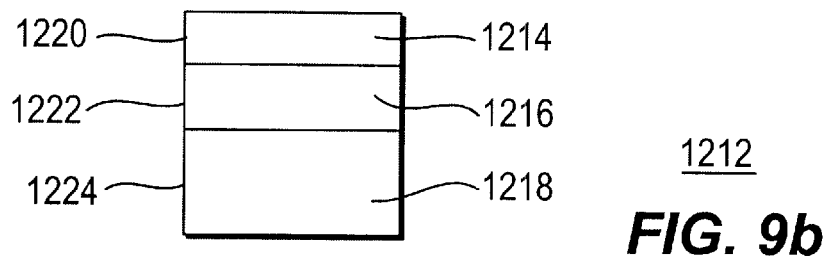

FIG. 9(*a*) illustrates a third embodiment of the invention using a color screen illuminated by an infrared (IR) laser. A color projection system 1200 includes a scanning IR laser 1202, an HEA 1204 and a viewing screen 1210. The viewing screen 1210 includes a plurality of triads 1212. As shown in FIG. 9(*b*), each triad 1212 consists of a red triad section 1214, a green triad section 1216 and a blue triad section 1218, which are correspondingly coated with up converting phosphors 1220, 1222 and 1224. The laser 1202 modulates and projects a laser beam 1206 that arrives at a holographic element 1208 of the HEA 1204. The holographic element 1208 has been pre-configured to focus and aim the laser beam 1206 onto a specific one the sections 1214, 1216 or 1218 of the triad 1212. All elements of the HEA 1204 are similarly configured to focus and aim on a corresponding triad section. As the laser 1202 scans the HEA 1204, a color image is created on the viewing screen 1210.

Figure 10:
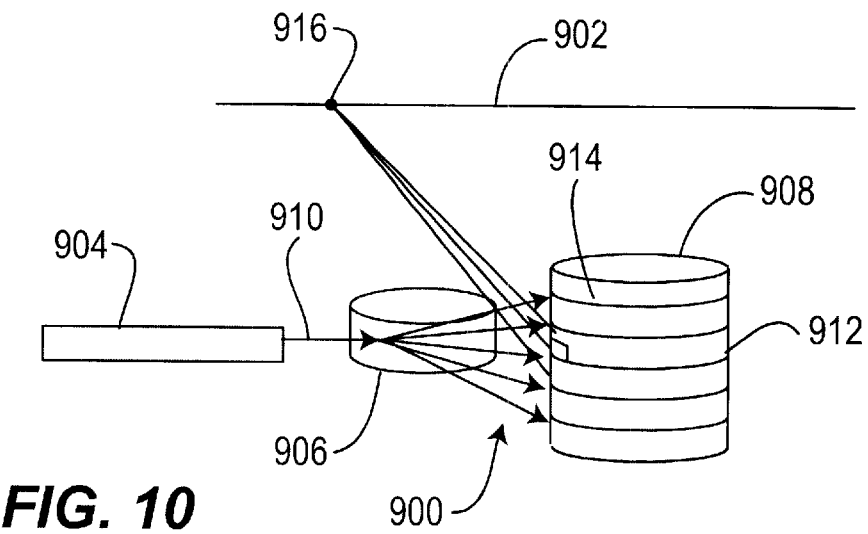
FIG. 10 shows an embodiment of the invention in which holographic elements reflect light.

FIG. 10 shows an embodiment of the invention in which an HEA reflects incident light. A scanner 900 comprises an image generator 904, a first rotating drum 906 and a second rotating drum 908. The image generator 904 projects a modulated laser beam 910 that the first rotating drum 906 receives. The second rotating drum 908 has a plurality of tracks, that each correspond with a screen line. The track 912 has an HEA 914. The modulated laser beam 910 is received by element 914, which deflects and focuses the beam to form a spot 916 on screen 406 (the screen is not shown). Rotation of drum 908 scans spot 916 to trace a screen line 902. The next screen line is traced by reflection of a beam from the next track of drum 908, and so on.

Figure 11:
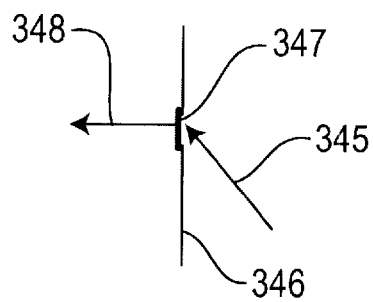
FIG. 11 shows a screen design in an embodiment of the invention.

In the above embodiments of the invention, the screen was disclosed to have Fresnel lens elements to collimate incoming beams at acute incidence angles. A diffractive element, as shown in FIG. 11, serves the function of the Fresnel lens elements 214 or 216 in FIG. 3(b). An incident beam 345 arrives at a diffractive element 347 of a screen 346 and is diffracted to yield a collimated beam 348. An advantage of the diffractive screen is that the holographic pattern may be very well embossed upon a thin plastic sheet. An extremely low-cost screen is realized by binding this sheet to a sturdier piece and using a diffuser or filter.

The examples given herein are presented to enable those skilled in the art to more clearly understand and practice the invention. The examples should not be considered as limitations upon the scope of the invention, but as merely illustrative. Numerous modifications and alternative embodiments of the invention will be apparent to those skilled in the art in view of the foregoing description.

What is claimed is:

1. An image projection system comprising:
   an image generator operable to project an image;
   a screen; and
   a focus and aim component including at least two focus and aim devices having different focal lengths, each operable to focus a spatial portion of the image on a corresponding selected portion of the screen, wherein the spatial portion is not identical to another portion focused by another focus and aim device.

2. The image projection system of claim 1, wherein the focus and aim devices include:
   a light-focusing device for focusing the light on the selected portion of the screen; and
   a light-deflecting device for deflecting the light to the selected portion of the screen.

3. The image projection system of claim 2, wherein the light-focusing device is a lens and the light-deflecting device is a prism.

4. The image projection system of claim 2, further including a plurality of light-focusing devices and a plurality of light-deflecting devices to form a composite image, wherein the composite image is formed at the screen and has a portion that corresponds to at least one pixel, an image generator has an array of pixels that includes the at least one pixel, and the image generator modulates the light beam corresponding to the at least one pixel by an image value that is a characteristic of that portion.

5. The image projection system of claim 1, wherein the viewing screen comprises a TIR Fresnel lens.

6. The image projection system of claim 1 wherein the projection system is a rear projection system.

7. The image projection system of claim 1, wherein the image generator is operable to modulate light representative of at least one pixel and the light received by the focus and aim devices is the modulated light.

8. A focus and aim component comprising:
   at least two light-focusing devices; and
   at least two corresponding light-deflecting devices;
   wherein the corresponding focusing and deflecting devices are disposed to receive a light beam in tandem representative of at least one pixel; and
   wherein each of the tandem focusing and deflecting devices focuses and aims the beam as a function of corresponding spot positions on a screen.

9. A method of projecting an image, wherein the method comprises using at least two focus and aim devices, having different focal lengths, each operable to focus a spatial portion of an image on a corresponding selected portion of a screen, wherein the spatial portion is not identical to another portion focused by another focus and aim device.

10. The method of claim 9, wherein an image generator is operable to modulate light representative of at least one pixel and the light received by the focus and aim devices is the modulated light.

11. A scanning projection system comprising:
    an image generator having an array of addressable light directions, each direction being represented by a light beam from the generator;
    a viewing screen having multiple spot positions; and
    a focus and aim component including:
       at least two light-focusing devices; and
       at least two corresponding light-deflecting devices;
       wherein the corresponding focusing and deflecting devices are disposed to receive the light beam having corresponding addressable direction in tandem; and
       wherein each of the tandem focusing and deflecting devices focuses and aims the beam as a function of corresponding spot positions on the viewing screen.

12. The system of claim 11 wherein the image generator comprises a laser and a rotating prism.

13. The system of claim 12 wherein, as the prism rotates, a scanning beam is deflected at an orientation, wherein the orientation traverses ones of the addressable light directions.

14. A method of projecting an image comprising the steps of:
    dividing the image into beams, each of the beams representative of a selected portion of the image;
    aiming ones of the beams as a function of spot positions on a screen; and
    focusing corresponding ones of the beams as a function of the corresponding spot positions on the screen, wherein at least one of the corresponding ones of the beams and at least one other of the corresponding ones of the beams have different focal lengths.

* * * * *